(12) United States Patent  (10) Patent No.: US 7,477,873 B2
Tanaka et al.  (45) Date of Patent: Jan. 13, 2009

(54) WIRELESS COMMUNICATION SYSTEM AND METHOD FOR FACILITATING WIRELESS COMMUNICATION

(75) Inventors: Atau Tanaka, Paris (FR); Guillaume Valadon, Charenton le Pont (FR); Laurent Violette, Vernon (FR)

(73) Assignee: Sony France, La Garenne (FR)

( * ) Notice: Subject to any disclaimer, the term of this patent is extended or adjusted under 35 U.S.C. 154(b) by 372 days.

(21) Appl. No.: 10/865,141

(22) Filed: Jun. 10, 2004

(65) Prior Publication Data

US 2005/0164634 A1  Jul. 28, 2005

(30) Foreign Application Priority Data

Jun. 11, 2003  (EP) .................................. 03291391

(51) Int. Cl.
    *H04B 7/00*  (2006.01)
(52) U.S. Cl. ................. 455/41.2; 455/426.1; 455/552.1
(58) Field of Classification Search ................ 455/41.2, 455/426.1, 552.1, 553.1
    See application file for complete search history.

(56) References Cited

U.S. PATENT DOCUMENTS

| | | | |
|---|---|---|---|
| 5,452,075 A * | 9/1995 | Edwall ...................... | 356/73.1 |
| 2002/0065099 A1* | 5/2002 | Bjorndahl ................... | 455/553 |
| 2002/0103004 A1* | 8/2002 | Vassilovski et al. ......... | 455/553 |
| 2002/0156894 A1* | 10/2002 | Suorsa et al. ............... | 709/226 |
| 2002/0186676 A1* | 12/2002 | Milley et al. ................ | 370/341 |
| 2003/0097297 A1* | 5/2003 | Cavarretta et al. ........... | 705/14 |

FOREIGN PATENT DOCUMENTS

| | | |
|---|---|---|
| EP | 1 024 626 | 8/2000 |
| EP | 1 102 430 | 5/2001 |
| EP | 1 274 194 | 1/2003 |
| WO | WO 03 017592 | 2/2003 |
| WO | WO 03 077498 | 9/2003 |

OTHER PUBLICATIONS

Venkatraman L et al: "A novel authentication scheme for ad hoc networks" IEEE, vol. 3, Sep. 23, 2000, pp. 1268-1273, XP010532729.
Jacobs S et al: "Manet Authentication Architecture" IETF, Mar. 1999, XP002206450.

* cited by examiner

*Primary Examiner*—Nay A. Maung
*Assistant Examiner*—Tuan H Nguyen
(74) *Attorney, Agent, or Firm*—Oblon, Spivak, McClelland, Maier & Neustadt, P.C.

(57) ABSTRACT

In a system and method for facilitating wireless communication between agents in a wireless network, each agent is equipped with an agent's device (10a, 10b) using a main wireless infrastructure (2) and a separate auxiliary wireless infrastructure (1). Initial contact between any first agent's device (10a) and any other agent's device (10b) is made within the auxiliary wireless infrastructure, whereas, once this initial contact has been established, all ensuing communications between the first agent's device (10a) and the other agent's device (10b) take place within the main wireless infrastructure.

8 Claims, 6 Drawing Sheets

FIG.16 — Token: Manu's public key signed by Doug — Kat confirms that received token is good

FIG.17

FIG.18 — Kat confirms that Manu is Manu, and accepts his public key

FIG.19 — Manu confirms that Kat is Kat, and accepts her public key

WIRELESS COMMUNICATION SYSTEM AND METHOD FOR FACILITATING WIRELESS COMMUNICATION

TECHNICAL FIELD

The present invention relates to a communication system and a method for facilitating communication between agents in a wireless network.

BACKGROUND ART

The use of wireless networks such as for example networks of personal wireless entertainment devices is expanding rapidly. In all wireless networks which represent electronic communities where a number of agents representing or assisting people, businesses or devices interact, there is the problem of quickly and efficiently initiating communication with a new agent. However trust between different agents must be adequately defined to avoid any intrusion of undesirable agents within the network.

Known systems are often centralized or complex with replication of information and require very large data structures or imply significant power consumption.

Moreover there is a need for improving trust management in peer-to-peer (P2P) environments where unknown agents are frequently introduced.

SUMMARY OF THE INVENTION

It is therefore an object of the present invention to provide a method and a system which remedy the abovementioned drawbacks of the known wireless networks.

More specifically the present invention aims at improving access of an agent to a wireless network.

According to another object of the present invention, security should be increased whilst optimising transaction efficiency and reducing data redundancy.

The objects of the present invention are obtained through a method for facilitating wireless communication between agents in a wireless network, wherein each agent is equipped with an agent's device using a main wireless infrastructure and a separate auxiliary wireless infrastructure which is distinct from the main wireless infrastructure, and wherein initial contact between any first agent's device and any other agent's device is made within the auxiliary Wireless infrastructure whereas, once this initial contact has been established, all ensuing communications between said first agent's device and said any other agent's device take place within the main wireless infrastructure.

The initial step of establishing communications between devices on a wireless network is facilitated by the use of a separate auxiliary infrastructure which is distinct and typically simpler than the main pervasive infrastructure.

According to a specific embodiment of the present invention, the main wireless infrastructure does not pre-exist before said initial contact and said initial contact made on the auxiliary wireless infrastructure includes the step of exchanging information to set up an ad-hoc wireless network between said first agent's device and said other agent's device.

The present invention thus relates to a technique which uses dual wireless infrastructures and is suitable for establishing ad-hoc connections. In the sense of the present invention the main infrastructure may thus include an ad-hoc network which is a collection of wireless mobile nodes dynamically forming a temporary network, mobile nodes operating as hosts and as routers.

According to another specific embodiment, the main wireless infrastructure is pre-existent to said initial contact and said other agent's device has already been recognised by said main wireless infrastructure before said initial contact.

According to a particular embodiment, the auxiliary wireless infrastructure uses a short-range device, said initial contact is established between said first agent's device and said at least one access point device and, once said first agent's device has been localized by said at least one access point device, communication is established between said first agent's device and other agent's devices over the main wireless infrastructure which comprises a pervasive wireless local area network (WLAN).

According to another particular embodiment, the auxiliary wireless infrastructure uses a line-of-sight transmission for exchanging basic identification information between a first agent's device and another agent's device during said initial contact, and further communication between said first agent's device and said other agent's device is achieved over a main wireless infrastructure comprising a wireless local area ad-hoc network.

According to an aspect of the invention, during the initial infrared connection within the auxiliary wireless infrastructure, said first agent's device and said other agent's device negotiate configuration settings for communicating within the main wireless infrastructure, said configuration settings comprising at least Service Set Identifier (SSID), channel and Internet Protocol (IP) address.

Advantageously said configuration settings further comprise a wired equivalent privacy (WEP) key.

Thus the step of making initial contact on the auxiliary infrastructure serves to identify the agents, agree upon configuration parameters for the main infrastructure and exchange authentication keys for ensuing transactions on the main infrastructure.

According to another aspect of the present invention, said first agent's device having been put into communication with a first other agent's device within the main wireless infrastructure is allowed to hierarchically discover, in cascading series of discoveries, other agent's devices based on acquaintances already known to said first other agent's device after said initial contact.

The invention thus encompasses a method for facilitating communication between agents in a network, wherein each agent is equipped with an agent's device using a main infrastructure and wherein a first agent's device having been put into communication with a first other agent's device within the main infrastructure is allowed to hierarchically discover, in cascading series of discoveries, other agent's devices based on acquaintances already known to said first other agent's device.

More specifically, each agent's device includes a local database of acquaintances which keeps a history of previous interactions with other agent's devices with the names of the other agents and the levels of acquaintances.

Any original interaction between two different agent's devices establishing an acquaintance is recorded by each agent's device keeping a friendly token of the original interaction.

Preferably, said friendly token comprises a private encryption key signed certificate that can be read by a public encryption key.

Advantageously, in the databases of acquaintances, the agents are distributed among a total of three to six levels of acquaintances.

In the database of acquaintances of a defined agent, the level 0 of acquaintances comprises level 0 agents with whom interaction was initiated via direct contact with said defined agent, the level 1 of acquaintances comprises level 1 agents with whom there has not been direct contact with said defined agent, but who have been introduced to said defined agent by a level 0 agent, the level 2 of acquaintances comprises level 2 agents who have been introduced to said defined agent by a level 1 agent, and so on, the trust decreasing from level 0 of acquaintances to the level N of acquaintances, N being comprised between 2 and 5.

Levels of acquaintanceship with heretofore unknown agents are verified directly at transaction time during said initial contact.

To sum up the abovementioned technique according to the present invention is based on mutual trust, local records and distributed authentication, keeping potential intrusion localised.

The present invention further relates to a wireless communication system comprising a main wireless infrastructure and a separate auxiliary wireless infrastructure using a plurality of agent's devices each being equipped with detection means for establishing contact with at least another agent's device within said separate auxiliary wireless infrastructure and communication means for communicating with other agent's devices within said main wireless infrastructure, wherein said detection means are adapted to provide initial contact between any first agent's device and any other agent's device within the auxiliary wireless infrastructure whereas said communication means are adapted to ensure communications between said first agent's device and said other agent's device within the main wireless infrastructure once the initial contact has been established by said detection means.

According to a particular embodiment, said main wireless infrastructure is an ad-hoc wireless network set up by agent's devices once the initial contact has been established by the detection means of said agent's devices within an auxiliary wireless infrastructure.

According to a particular embodiment said auxiliary wireless infrastructure uses a short-range wireless connection and includes at least one access point device and said main wireless infrastructure comprises a pervasive wireless local area network (WLAN).

According to another particular embodiment, said detection means comprise means for transmitting and receiving an infrared-beam for exchanging basic identification information between a first agent's device and another agent's device during the initial contact.

The main wireless infrastructure may comprise a high frequency wireless local area ad-hoc network.

According to another aspect of the invention, each agent's device includes means for storing a local database of acquaintances which keeps a history of previous interactions with other agent's devices with the names of the other agents and the levels of acquaintances.

The invention thus encompasses a wireless communication system comprising a main wireless infrastructure using a plurality of agent's devices, each agent's device comprising communication means for communicating with other agent's devices within the main wireless infrastructure and means for storing a local database of acquaintances which keeps a history of previous interactions with other agent's devices with the names of the other agents and the levels of acquaintances.

Agent's devices may comprise terminals such as mobile phones, computers, personal digital assistants.

The invention further relates to a computer readable medium having computer-executable instructions for an agent's device of a communication network which is put into communication with a first other agent's device within said communication network, said computer-executable instructions performing the steps of hierarchically discovering, in cascading series of discoveries, other agent's devices based on acquaintances already known to said first other agent's device.

BRIEF DESCRIPTION OF THE DRAWINGS

Additional objects and features of the invention will be more readily apparent from the following detailed description and appended claims when taken in conjunction with the drawings, in which:

DETAILED DESCRIPTION OF THE PREFERRED EMBODIMENTS

Figure 1:
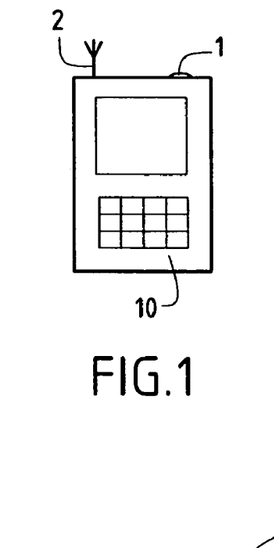
FIG. 1 is a schematic view of an example of a terminal equipment constituting an agent's device which may be used in a wireless communication system according to the invention.

FIG. 1 shows an example of a terminal equipment 10 which is suitable to be used in a wireless communication system according to the invention. Terminal 10 comprises conventional input means, display means, computing and processing means and information storage means. In addition terminal 10 comprises both a short scale wireless interface 1 and a long scale wireless interface 2.

The terminal equipment 10 constitutes an agent's device such as for example a mobile phone, a laptop computer, a notebook, a personal digital assistant (PDA), a pager or any other kind of electronic equipment which enables an agent representing people, businesses or devices to communicate via a wireless network. The terminal equipment 10 may comprise software as well as hardware devices.

The short scale wireless interface 1 is used for initializing network configuration when the terminal's user wants to initiate communication with another terminal. When a first terminal 10a wants to initiate communication with another terminal 10b (FIG. 2), initial contact is made via the short scale wireless interfaces 1 of terminals 10a and 10b thus using a separate auxiliary infrastructure which is distinct and typically simpler than the main pervasive infrastructure used by the terminals for communicating via their long scale wireless interfaces 2.

Figure 2:
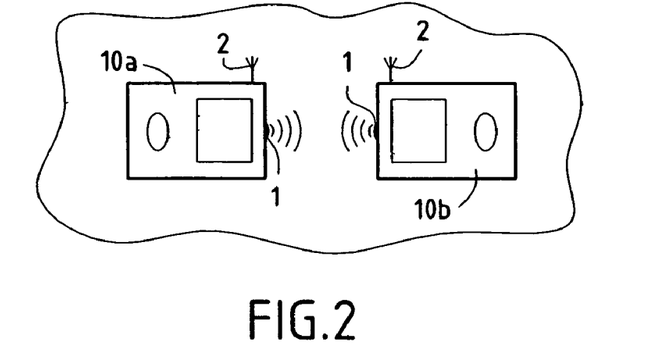
FIG. 2 is a schematic view of a first embodiment of a wireless communication system according to the invention with a dual wireless infrastructure using infrared means for initializing ad-hoc wireless network configuration.

The step of initial contact between terminals 10a and 10b via their short scale wireless interfaces 1 through the separate auxiliary infrastructure serves to identify the agents, agree upon configuration parameters for the main infrastructure, and exchange authentication keys or other means of acknowledgement for ensuing transactions on the main infrastructure. Once this initial contact has been established, all ensuing communications take place on the main infrastructure.

FIGS. 4 to 7 illustrate different steps of the initialization of communications between two devices 10a and 10b on a wireless network using dual wireless infrastructures according to the invention.

The method according to the invention is particularly adapted for establishing ad-hoc connections in ad-hoc networks, i.e. proximity networks in which some of the network devices are part of the network only while in range of the rest of the network or for the duration of a communications session.

Under such conditions the short scale wireless interface 1 of the terminals may use a line-of-sight transmission within the auxiliary wireless infrastructure for exchanging basic identification information during the initial "direct" contact between the terminals 10a and 10b.

Thus infrared may be used to bootstrap ad-hoc wireless network configuration, e.g. according to the technique provided by the Infrared Data Association (IrDA). A focused ray of light in the infrared frequency spectrum is modulated with information and sent from a transmitter to a receiver over a relatively short distance. In this example, the short scale wireless interfaces 1 of the terminals 10a, 10b, . . . include a transceiver combining infrared transmitter and receiver.

In the example considered in FIG. 4 to 7, the main wireless infrastructure is constituted by a pervasive wireless fidelity (Wi-Fi) network, i.e. a high frequency wireless local area network (WLAN). Wi-Fi is specified in the 802.11b specification from the Institute of Electrical and Electronics Engineers (IEEE). The 802.11b (Wi-Fi) technology operates in the 2.4 Ghz range and uses a modulation method known as complementary code keying (CCK). To safeguard security preferably some encryption means should be provided and may use for example the Wired Equivalent Privacy (WEP) encryption standard. As can be seen the pervasive long scale main wireless infrastructure is clearly different from the short scale auxiliary wireless infrastructure which requires "direct contact" between the terminals through a line-of-sight light transmission.

Figure 4:
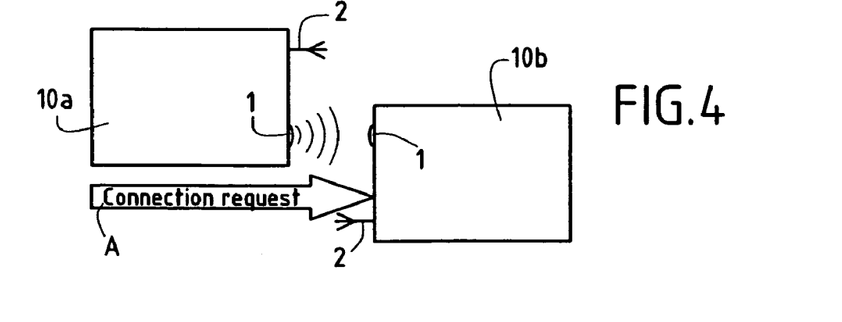
FIG. 4 is a schematic diagram illustrating a connection request via short range contact between two terminal equipments of a wireless communication system according to the invention.

FIG. 4 illustrates the first step of a connection request A via short range "contact". The transmitter of the short scale wireless interface 1 of terminal 10a transmits a connection request to the receiver of the short scale wireless interface 1 of terminal 10b.

Figure 5:
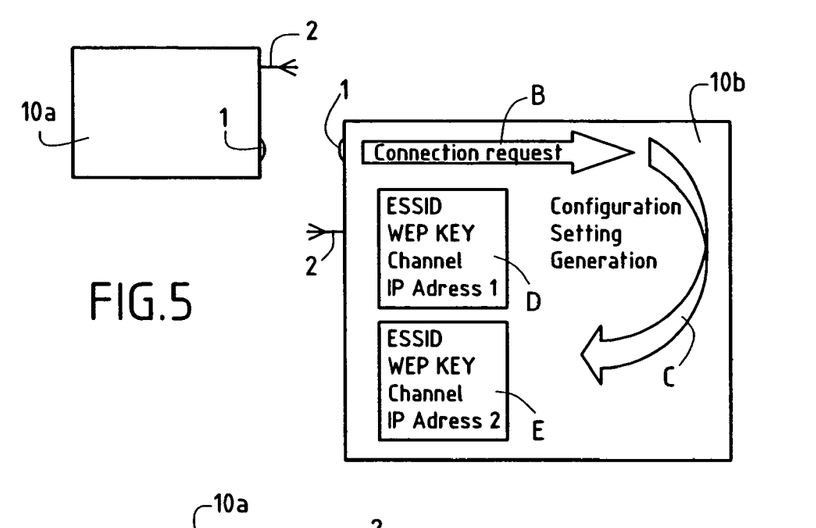
FIG. 5 is a schematic diagram illustrating the configuration setting generation between the two terminal equipments of FIG. 4.

FIG. 5 illustrates the generation of configuration settings. Following the receipt B by terminal 10b of the connection request from terminal 10a, configuration settings C are generated by terminal 10b. These configuration settings comprise two settings D and E relating to terminal 10a and terminal 10b respectively.

Each configuration setting may comprise Extended Service Set Identification Data (ESSID), i.e. identification data of specific access points to the network, WEP key, channel and Internet Protocol (IP) address.

Figure 6:
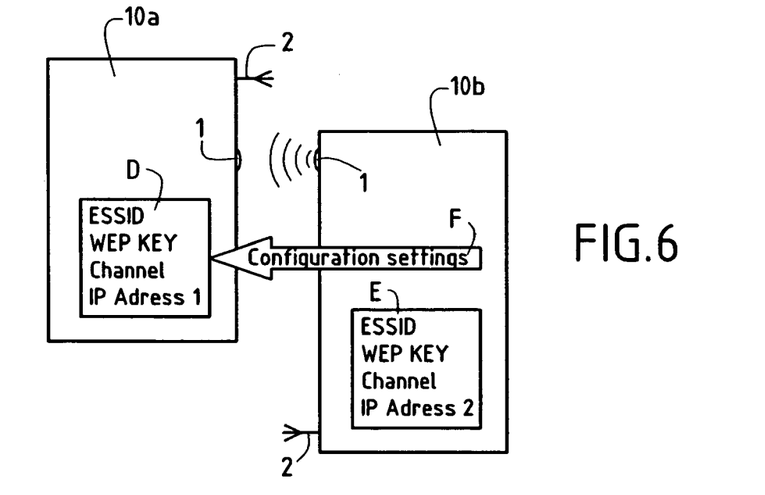
FIG. 6 is a schematic diagram illustrating the reply configuration settings between the two terminal equipments of FIGS. 4 and 5.

FIG. 6 illustrates the step of reply F by terminal 10b which implies transmission via its short scale wireless interface 1 of the configuration settings D concerning terminal 10a.

Figure 7:
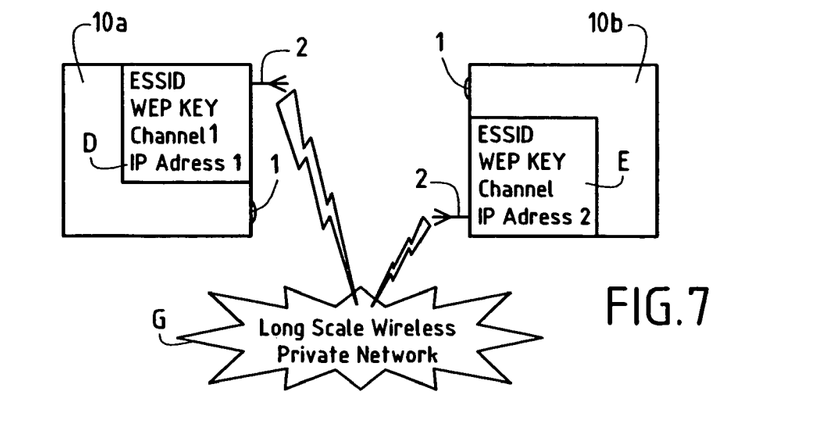
FIG. 7 is a schematic diagram illustrating the launching of long scale interface between the two terminal equipments of FIGS. 4 to 6 to enable communication between the terminal equipments within a main infrastructure constituted by a long scale wireless private network.

FIG. 7 illustrates the following step of connection of both terminals 10a and 10b via their long scale wireless interfaces 2 through a long scale wireless private network G, each terminal 10a respectively 10b including its own configuration settings D respectively E.

Thus when using infrared (IrDA) to initialize ad-hoc wireless network configuration, two devices initiate contact via an IR beam, exchanging basis identification information. Over this initial IR connection they negotiate a configuration for the Wi-Fi (at least SSID, channel, IP addresses). Each device then configures his respective 802.11 settings based on this negotiation. The devices are then connected over 802.11 ad-hoc mode automatically.

It may be noted that according to conventional device discovery and service discovery methods, the arrival of a new device is announced to all other devices in range. The newly arriving device thus "sees" all the other devices with no distinction and obtains a flat list of all who are out there. By contrast according to the present invention the device such as terminal 10a under user control selectively and automatically initiates communication with a specific partner device such as terminal 10b. Consequently the newly arriving device can hierarchically discover the other devices in range based on "acquaintances" already known to the partner device with whom he initiates contact. This cascading series of device discovery based on "introduction" mirrors social interaction and is an innovative method to establish trust in ad-hoc wireless and peer-to-peer (P2P) networks.

This concept can be used in two different ways (depending on existing wireless network or not) to join an existing network or set up a personal and secure wireless network.

In the first case there is no pre-existing network infrastructure. Two terminals such as 10a, 10b exchange information through the auxiliary wireless infrastructure to set up the ad-hoc wireless network which constitutes a main wireless infrastructure.

In the second case a wireless network is already in use and constitutes a pre-existing main wireless infrastructure. The terminal such as 10a who wants to join the network has to exchange information through the auxiliary wireless infrastructure with one of the terminals such as 10b which are already using the main wireless infrastructure.

The invention may have a great variety of applications using the auxiliary wireless infrastructure, such as for example:

Set up free spontaneous temporarily ad-hoc network between peers without any existing main structure (e.g. the process of meeting someone in the street).

Gain temporary access to a corporate wireless network (e.g. printing a document or checking one's E-mail during a meeting in a company's building).

Associate beam of the short scale wireless interface with payment to provide easy way to initialize pay-per-hour Internet or service access.

Figure 3:
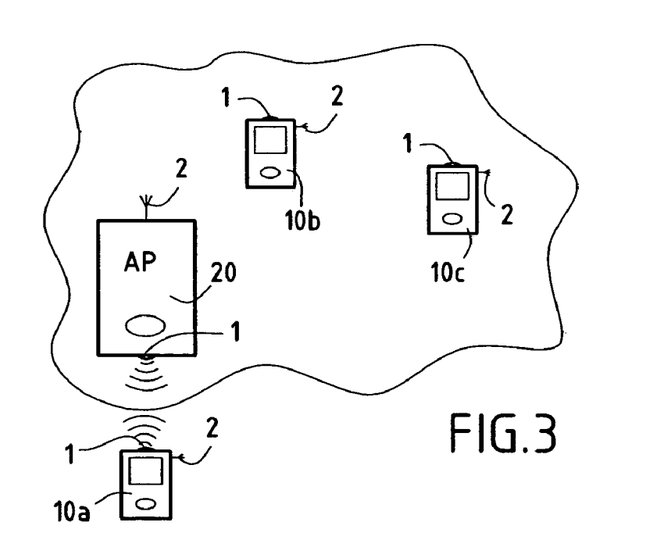
FIG. 3 is a schematic view of another embodiment of a wireless communication system according to the invention with a dual wireless infrastructure using a short-range wireless connection and a pervasive high frequency wireless local area network.

FIG. 3 illustrates another specific example of a system according to the invention. The main wireless infrastructure is a pervasive Wi-Fi network including a plurality of terminals 10a, 10b, 10c, . . . each comprising both a short scale wireless interface 1 and a long scale wireless interface 2. The auxiliary wireless infrastructure implies short-range radio links such as according to the Bluetooth specification. Access Points (AP) 20 are also equipped both with a short scale wireless interface 1 and a long scale wireless interface 2. Thus in the example of FIG. 3, both Bluetooth and 802.11b specifications are used for user localization. Bluetooth being used as a short range infrastructure, the movements of a user having a terminal 10a is detected by Bluetooth APs 20 in each room. Data that reflect the system's responsiveness to user location is then deployed over the pervasive Wi-Fi network.

The social mechanisms for establishing trust in ad-hoc networks will now be described in a more detailed manner.

Each agent maintains in its terminal 10 a database (Buddy List) of "acquaintances". This database keeps the names of the other previously known agents and a level (Access Permissions) of acquaintance for each known agent. Record of acquaintance is confirmed by each agent keeping a "Friendly Token" of the original interaction, i.e. a private key signed certificate 41, 42, 43 that can be read by a public key 21, 22, 23 (see FIGS. 15 to 19).

Level 0 agents are the closest acquaintances, i.e. agents with whom interaction was already initiated via direct contact as described above. These are agents with whom there exists the greatest trust and therefore these agents have the most access permissions.

Level 1 agents are agents with whom there has not been direct contact. Instead, Level 1 agents have been "introduced" by a Level 0 agent. There is trust, but less than for Level 0 acquaintances.

Level 2 agents are those who have been introduced by Level 1 agents. Trust correspondingly decreases.

Diminishing levels continue in this fashion. Although the system is not limited in the number of levels, satisfactory results may be obtained with a total of three to six levels.

It will be noted that the method and system according to the present invention do not imply any propagation. There is no centralized database keeping the state of the entire network. This not only increases fault resilience, but also optimises transaction efficiency. This reduces trust information redundancy in the system. Each agent keeps only a list of agents it knows, i.e. a history of interactions it has had.

Levels of acquaintanceship with heretofore unknown agents can be verified at transaction time. Short of initiating a new Level 0 ("direct") contact, agent III approaches agent I "on behalf" of agent II. In this case, agent III sends a friendly token that agent I can verify using the public key of agent II. Accordingly, trust is determined directly and does not depend on reputation nor the problem of evaluating validity of reputation reporting. Indeed evaluating validity of reporting is a typical problem of reputation networks that create overhead of second order trust evaluation needs: can an agent I trust what agent II says about agent III? The present system eliminates this second order effect.

According to the invention misbehaving agents are not reported, thus decreasing total system communications overhead. There are no complaints nor reporting. An agent keeps record of a bad transaction by lowering the trust level by 1 of the "bad" agent. The repercussion of misbehaviour lowers not only the trust level of the misbehaving agent, but all acquaintances of that agent, i.e. getting downgraded by someone automatically downgrades all your friends that you have introduced.

The onus of cheating lies then in the burden of lowering the trust before others in one's entire sphere of acquaintances. The ultimate penalty is to be omitted from group membership.

The invention provides a number of advantages. Thus for service discovery, the invention permits to indicate immediately with which agent a transaction is desired whereas according to conventional methods without "direct contact" the agent seeking a service is lost in a list of proposed services that is disconnected from the physical or social proximity at hand.

For trust, the "direct contact" assures secure initial exchange of encryption keys between the agents whereas traditional security is pyramidal and a weak link can make the whole chain vulnerable.

Being based on mutual trust, local records and distributed authentication, the method and system according to the invention keeps potential intrusion localized.

Once device interaction is initialized by initial contact on one infrastructure that auto-configures the main infrastructure, social models of "contact" and "introduction" are used as a basis for service discovery. Spheres of device "acquaintance" are maintained, providing an elegant solution for trust and authentication in particular in networks of personal wireless entertainment devices.

The present invention implies a cascade of reputation that is ultra simple due to the introduction of a friend of a friend. There is no need for negotiation, no replication nor data redundancy of reputation data. There is no need for reputation propagation separate from communicating "friend of a friend" hierarchy at the time of the request. No complaint reporting is needed: the burden of cheating stays with the agent as onus of potentially lowering reputation of this entire group. Group dynamics will act to eject a poor member of any group. A group thus auto polices itself. The trust hierarchy based on spheres of contact (layers of acquaintances) is particularly adapted to association of multiple devices in an ad-hoc network to a particular owner.

The process of introducing a new friend will be described with reference with FIGS. 8 to 19.

The following notations will be used:

KName=private key of Name

PuName=public key of Name

[PuSomeone]Name=public key of Someone is signed by KName (Data)Name=Data is ciphered with Name's public key Verify([PuSomeone]Name, PuName)=verify a signed block with Name's public key : the result can be true or false Cipher(Data,PuName)=cipher Data with Name's public key. The result is (Data)Name.

Encryption is achieved with a public key whereas decryption is achieved with a private key. Data are signed with a private key.

Figure 8:
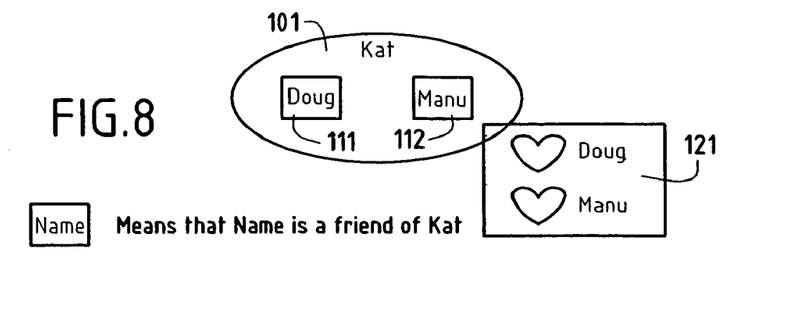
FIG. 8 is a schematic diagram illustrating with Friends' spheres the direct contact between close friends.

FIG. 8 illustrates the world of a given example with a sphere of friendship 101 for Kat and an associated table 121.

Both Doug (111) and Manu (112) are Kat's close friends, i.e. have had direct contact with Kat.

Figure 9:
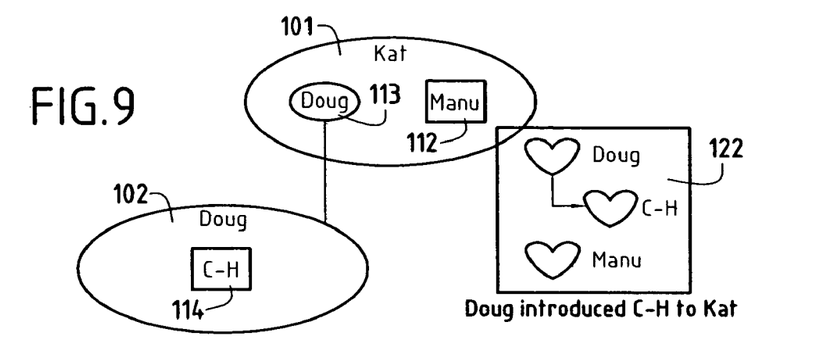
FIG. 9 is a schematic diagram illustrating with Friends' spheres a hierarchy of friendship.

FIG. 9 illustrates the world of the example of FIG. 8 with the introduction of another member C-H and some hierarchy.

Doug appears as an entry 113 in Kat's sphere of friends 101. Doug's sphere 102 has an entry 114 for his friend C-H. The associated table 122 shows the hierarchy after Doug had introduced C-H to Kat.

Figure 10:
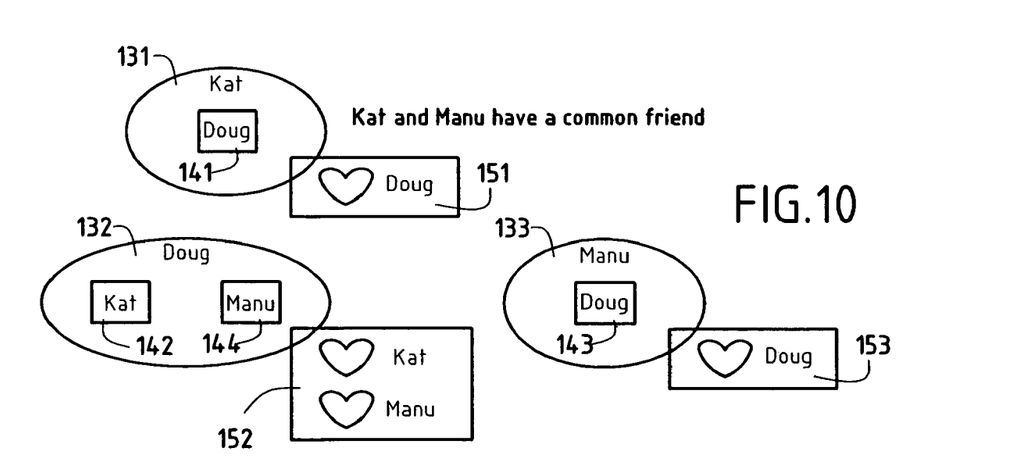
FIG. 10 is a schematic diagram illustrating with Friends' spheres the situation when a new friend is introduced.
Figure 11:
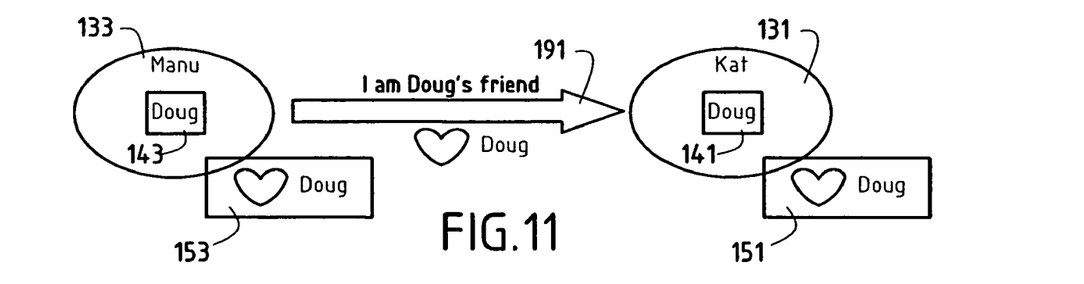
FIG. 11 and FIG. 12 are schematic diagrams illustrating with Friends' spheres two steps of an exchange between two agents when a new friend is introduced.
Figure 12:
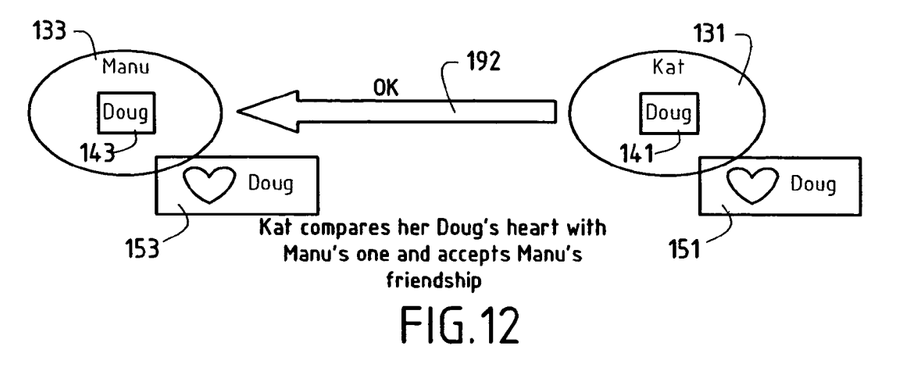

FIGS. 10 to 12 illustrate the process of introduction of a new friend.

Both Kat and Manu are Doug's friends. This is shown in the friends' spheres 131 and 133 of Kat and Manu respectively which both refer to Doug (141 and 143) and in the associated tables 151, 153. The friends' sphere 132 of Doug includes Kat (142) and Manu (144) as well as the associated table 152.

The situation of FIG. 10 may be summarized as follows:
Both Kat and Manu have their own private keys, namely Kkat and Kmanu respectively.

The associated table 151 of Kat includes the following information concerning Doug:
Name: Doug
Key: PuDoug
Friendship token: [PuKat]Doug The associated table 153 of Manu includes the following information concerning Doug:
Name: Doug
Key: PuDoug
Friendship token: [PuManu]Doug The table 152 associated with the friends'sphere of Doug contains similar information concerning Kat and Manu.

FIGS. 11 and 12 illustrate a first exchange between Manu and Kat who still do not know each other.

On FIG. 11, Manu sends an initial message 191 to Kat (via the auxiliary wireless infrastructure) saying "I am Doug's friend" which according to the abovementioned notation may be noted: [PuManu]Doug.

This first exchange means that Manu wants to be introduced to Kat by the intermediary of Doug.

Kat will extract Manu's public key using Doug's one and verify that Manu's assertion is true. This operation may be noted as follows:
Verify ([PuManu]Doug, PuDoug)=true Referring to FIG. 12, once Kat has compared her Doug's "heart" with Manu's one and may accept Manu's friendship, Kat will send back to Manu a message 192 of acceptance.

In the message 192 Kat sends back her public key as well as random data ciphered with Manu's public key. This operation may be noted as follows:
Cipher(ABC and PuKat, PuManu)=(ABC and PuKat)Manu wherein ABC represent random data and PuKat, PuManu are encrypted.

Manu will decrypt this block and extract the random data (here ABC) and Kat's public key. This operation Cipher$^{-1}$ may be noted as follows:
Cipher$^{-1}$ ((ABC and PuKat)Manu, Kmanu)=ABC and PuKat Manu will send back ABC ciphered with PuKat as follows:
Cipher (ABC, PuKat)=(ABC)Kat Kat then decrypts this block of data and verifies that she received what she has previously sent.

Preferably, Manu further does the same sort of exchange to be sure that Kat is the one she pretends to be.

Figure 13:
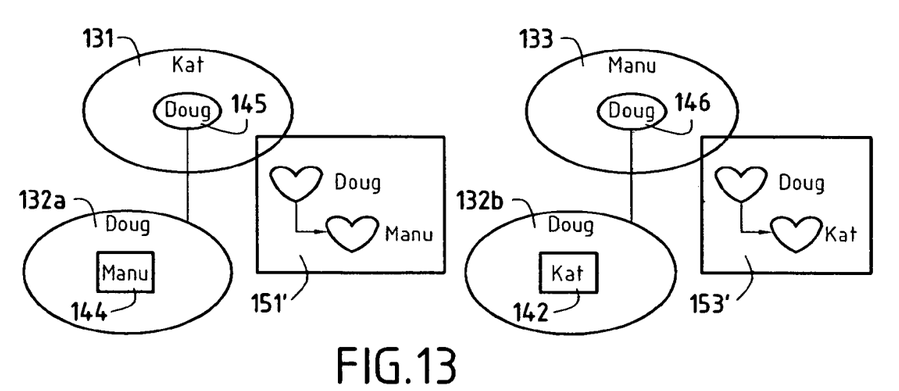
FIG. 13 is a schematic diagram illustrating with Friends' spheres the situation at the end of the exchange of FIGS. 11 and 12.

At this stage, Manu and Kat have exchanged enough information to build their new vision of the world which is illustrated on FIG. 13.

Doug appears as an entry 145 in Kat's sphere of friends 131. The entry 145 now refers to Doug's sphere of friends 132a where Manu appears as an entry 144. Similarly, Doug appears as an entry 146 in Manu's sphere of friends 133. The entry 146 now refers to Doug's sphere of friends 132b where Kat appears as an entry 142. The tables 151' and 153' which are respectively associated with friends' spheres 131 and 133 both include the relationship between Manu and Doug, and Kat and Doug respectively.

Figure 14:
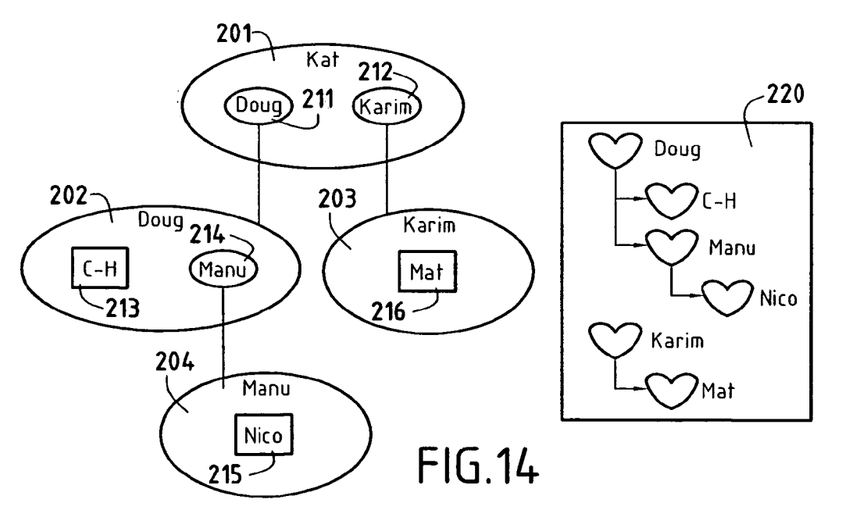
FIG. 14 is a schematic diagram illustrating with Friends' spheres a more complex hierarchy of friendship.

FIG. 14 shows another example of a set of friends' spheres in a more complex situation.

The friends' sphere 201 of Kat includes Doug (211) and Karim (212). The friends' sphere 202 of Doug includes C-H (213) and Manu (214). The friends' sphere 203 of Karim includes Mat (216). Finally, the friends' sphere 204 of Manu includes Nico (215). The table 220 associated with the friends' sphere 201 of Kat shows the hierarchical relationships of friendship between the different agents.

FIGS. 15 to 19 simply illustrate in a different manner the example, previously given where two agents Manu and Kat have a common friend Doug, and Manu wants to see Kat on behalf of Doug.

Figure 15:
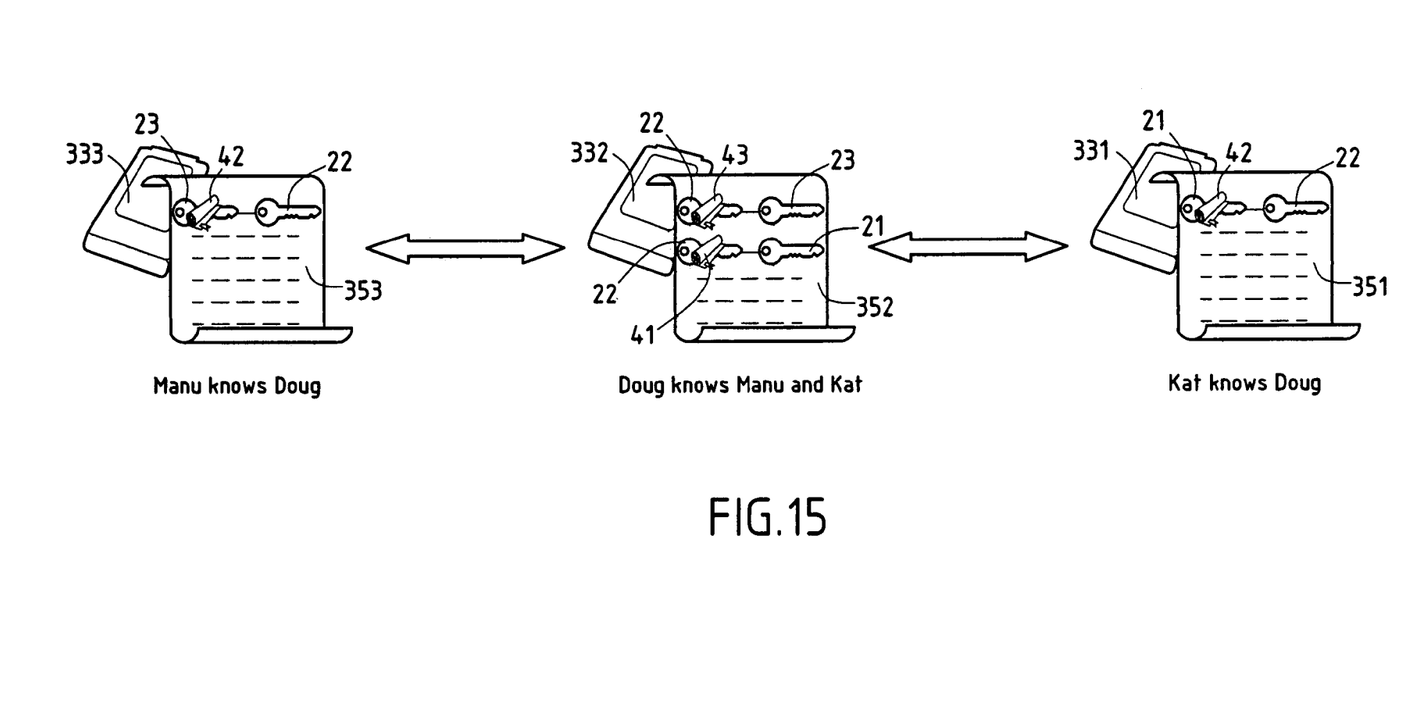
FIG. 15 is a schematic diagram illustrating the relationships between agents using private and public encryption keys.

FIG. 15 simply shows the agents' devices 331, 332, 333 respectively associated with Kat, Doug and Manu as well as the corresponding tables 351, 352, 353.

In the starting situation of FIG. 15, Kat's table 351 includes Doug's public key 22 as well as a token constituted by Kat's public key 21 with a certificate 42 signed by Doug. The certificate 42 signed by Doug as a private key owner can be read by anyone having Doug's public key.

Similarly, Manu's table 353 includes Doug's public key 22 as well as a token constituted by Manu's public key 23 with a certificate 42 signed by Doug.

Doug's table 352 includes Kat's public key 21 as well as a token constituted by Doug's public key 22 with a certificate 41 signed by Kat. Doug's table 352 further includes Manu's public key 23 as well as a token constituted by Doug's public key with a certificate 43 signed by Manu.

Figure 16:
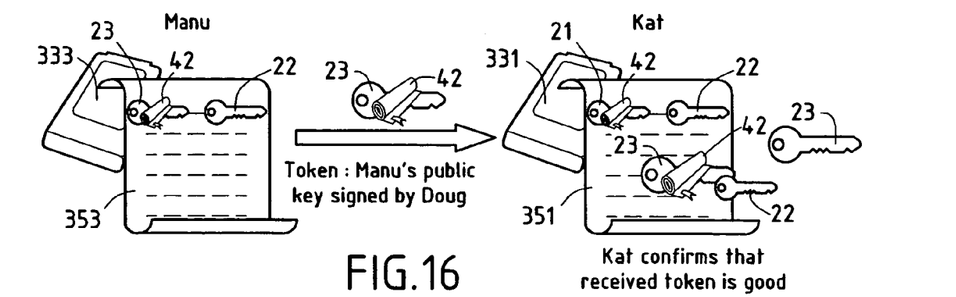
FIGS. 16 to 19 are schematic diagrams illustrating four steps of the exchanges between two agents of FIG. 15 which have a common friend.

FIG. 16 illustrates the step where Manu's device 333 sends to Kat's device 331 (preferably via the auxiliary infrastructure) a token comprising Manu's public key 23 with a certificate 42 signed by Doug.

Figure 17:
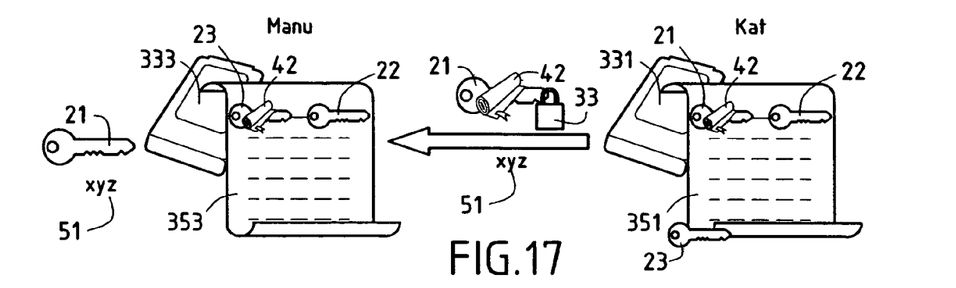

FIG. 17 illustrates the step where Kat's device 331 confirms that the received token is good and sends back to Manu's device 333 an encrypted message 33 which can be only decrypted by private key owner Manu. Such encrypted message includes a random generated string 51 defined as xyz and Kat's public key 21 with the certificate 42 signed by Doug.

Figure 18:
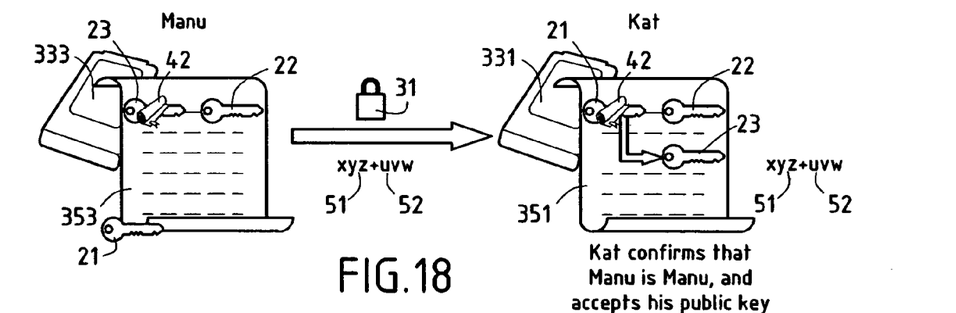

FIG. 18 illustrates the step where Manu's device 333 confirms that the received token is good and sends back to Kat's device 331 an encrypted message 31 which may only be decrypted by Kat's device 331 and includes the first random generated string 51 defined as xyz as well as a second random generated string 52 defined as uvw.

Figure 19:
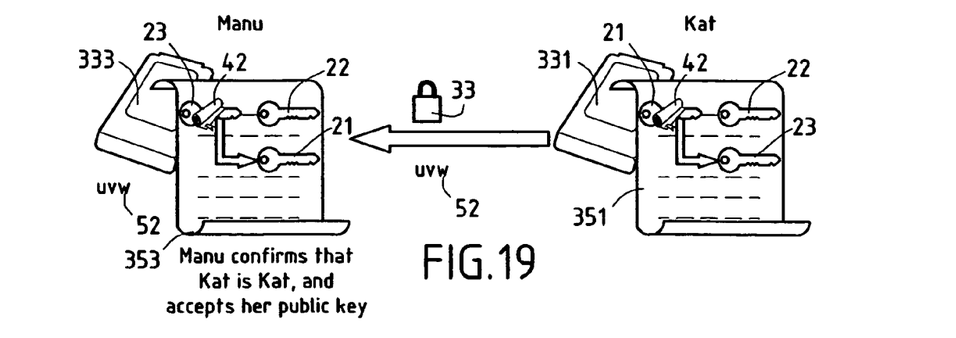

FIG. 19 illustrates the step where Kat's device 331 confirms reception of the random generated strings 51 and 52 defined as xyz and uvw and resends an encrypted message 33 which can only be decrypted by Manu's device 333 and includes the second random generated string 52 defined as uvw to confirm that Manu is Manu and that Kat's device 331 accepts Manu's device public key 23.

Finally Manu's device 333 also confirms reception of the random generated string 52 defined as uvw and in a similar way confirms that Kat is Kat and that Manu's device 333 accepts Kat's device public key 21.

In view of the many possible embodiments to which the principles of the invention may be applied, it should be recognized that the embodiments described herein with respect to the drawing figures are meant to be illustrative only and should not be taken as limiting the scope of the invention. For example, although it is preferable that the dual wireless infrastructures used for initializing ad-hoc networks be combined with the social models of "contact" and "introduction" as a basis for service discovery and as a way of establishing trust in ad-hoc networks, since this combination of features provides an effect of synergy, the process of maintaining spheres of device "acquaintance" could be used independently of dual wireless infrastructures within a single infrastructure.

The invention claimed is:

1. A wireless communication system comprising a main wireless infrastructure using a plurality of agent's devices, each agent's device comprising communication means for communicating with other agent's devices within the main wireless infrastructure and means for storing a local database of acquaintances which keeps a history of previous interactions with other agent's devices with the names of the other agents and the levels of acquaintances,
   wherein, in the database of acquaintances, the agents are distributed among a total of three to six levels of acquaintances, and
   wherein, in the database of acquaintances of a defined agent, the level 0 of acquaintances comprises level 0 agents with whom interaction was initiated via direct contact with said defined agent, the level 1 of acquaintances comprises level 1 agents with whom there has not been direct contact with said defined agent, but who have been introduced to said defined agent by a level 0 agent, the level 2 of acquaintances comprises level 2 agents who have been introduced to said defined agent by a level 1 agent, and so on, the trust decreasing from level 0 of acquaintances to the level N of acquaintances, N being comprised between 2 and 5.

2. A system according to claim 1, wherein agent's devices comprise terminals such as mobile phones, computers, personal digital assistants.

3. A computer readable medium having computer-executable instructions for an agent's device of a communication network which is put into communication with a first other agent's device within said communication network, said computer-executable instructions performing the steps of hierarchically discovering, in cascading series of discoveries, other agent's devices based on acquaintances already known to said first other agent's device,
   wherein each agent's device includes a local database of acquaintances which keeps a history of previous interactions with other agent's devices with the names of the other agents and the levels of acquaintances,
   wherein, in the databases of acquaintances, the agents are distributed among a total of three to six levels of acquaintances, and wherein, in the database of acquaintances of a defined agent, the level 0 of acquaintances comprises level 0 agents with whom interaction was initiated via direct contact with said defined agent, the level 1 of acquaintances comprises level 1 agents with whom there has not been direct contact with said defined agent, but who have been introduced to said defined agent by a level 0 agent, the level 2 of acquaintances comprises level 2 agents who have been introduced to said defined agent by a level 1 agent, and so on, the trust decreasing from level 0 of acquaintances to the level N of acquaintances, N being comprised between 2 and 5.

4. A method for facilitating communication between agents in a network, wherein each agent is equipped with an agent's device using a main infrastructure, wherein a first agent's device having been put into communication with a first other agent's device within the main infrastructure is allowed to hierarchically discover, in cascading series of discoveries, other agent's devices based on acquaintances already known to said first other agent's device,
   wherein each agent's device includes a local database of acquaintances which keeps a history of previous interactions with other agent's devices with the names of the other agents and the levels of acquaintances,
   wherein, in the databases of acquaintances, the agents are distributed among a total of three to six levels of acquaintances, and
   wherein, in the database of acquaintances of a defined agent, the level 0 of acquaintances comprises level 0 agents with whom interaction was initiated via direct contact with said defined agent, the level 1 of acquaintances comprises level 1 agents with whom there has not been direct contact with said defined agent, but who have been introduced to said defined agent by a level 0 agent, the level 2 of acquaintances comprises level 2 agents who have been introduced to said defined agent by a level 1 agent, and so on, the trust decreasing from level 0 of acquaintances to the level N of acquaintances, N being comprised between 2 and 5.

5. A method according to claim 4, wherein the main infrastructure is a wireless infrastructure.

6. A method according to claim 4, wherein any original interaction between two different agent's devices establishing an acquaintance is recorded by each agent's device keeping a friendly token of the original interaction.

7. A method according to claim 6, wherein levels of acquaintanceship with heretofore unknown agents are verified directly at transaction time during said initial contact.

8. A method according to claim 4, wherein said friendly token comprises a private encryption key signed certificate that can be read by a public encryption key.

* * * * *